United States Patent [19]

Kemp, Jr. et al.

[11] 4,352,682
[45] Oct. 5, 1982

[54] DEOXYGENATING APPARATUS

[75] Inventors: David M. Kemp, Jr., Naperville; Hartl R. Jones, Bensenville, both of Ill.

[73] Assignee: FMC Corporation, Chicago, Ill.

[21] Appl. No.: 206,455

[22] Filed: Nov. 13, 1980

[51] Int. Cl.³ .............................................. B01D 19/00
[52] U.S. Cl. ...................................... 55/165; 55/185; 55/193; 55/196; 55/206
[58] Field of Search ............... 55/39, 55, 189, 206, 55/233, 193, 196, 165, 185; 425/464; 426/475; 99/275, 277.2, 323.2; 261/94

[56] References Cited

U.S. PATENT DOCUMENTS

| | | | |
|---|---|---|---|
| 1,513,354 | 10/1924 | Wadsworth | 55/206 |
| 1,879,930 | 9/1932 | Gibson | 55/206 |
| 2,610,893 | 9/1952 | Collins et al. | 261/94 |
| 2,615,699 | 10/1952 | Dixon | 261/94 |
| 2,699,718 | 1/1955 | Wright | 99/275 |
| 3,165,387 | 1/1965 | Place | 55/233 |
| 3,581,474 | 6/1971 | Kent | 55/233 |
| 4,191,784 | 3/1980 | Mojonnier | 426/475 |
| 4,216,711 | 8/1980 | Skoli et al. | 99/277.2 |
| 4,259,360 | 3/1981 | Vonetucci | 426/475 |
| 4,265,167 | 5/1981 | Mojonnier et al. | 55/193 |

*Primary Examiner*—Robert H. Spitzer
*Attorney, Agent, or Firm*—Trexler, Bushnell & Wolters, Ltd.

[57] ABSTRACT

A gas exchange deoxygenating unit is disclosed. The unit comprises a hollow mixing chamber having an upstream water inlet. A gas inlet located downstream of the water inlet delivers carbon dioxide gas to the mixing chamber. Stainless steel wool material within the chamber encourages turbulent water and gas flow and intimate water and gas intermixing. The mixed water and gas flows from the mixing chamber to a deoxygenating chamber containing a number of foraminous members mounted at spaced apart locations. Excess carbon dioxide gas and replaced oxygen is drawn from the deoxygenating chamber at a slight negative pressure. Below the deoxygenating chamber is a water collecting tank, which mounts controls for adjusting the level of water in the tank and flow rate of water through the apparatus.

9 Claims, 6 Drawing Figures

FIG. 3
FIG. 5
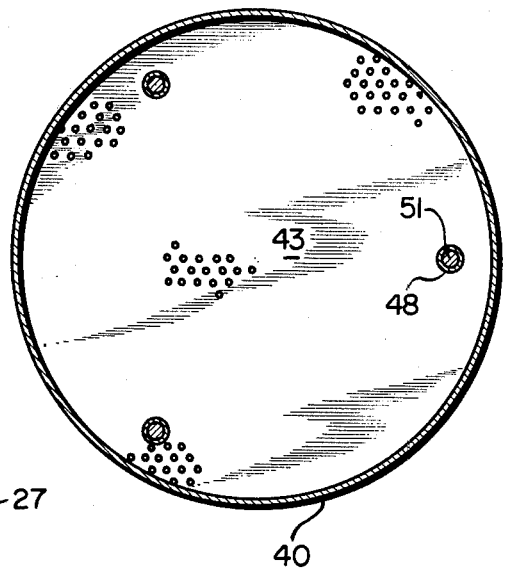
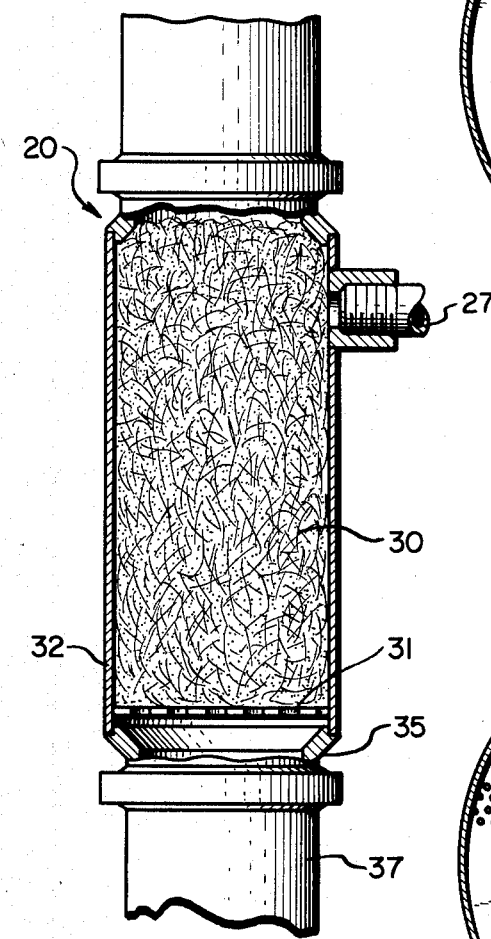
FIG. 6
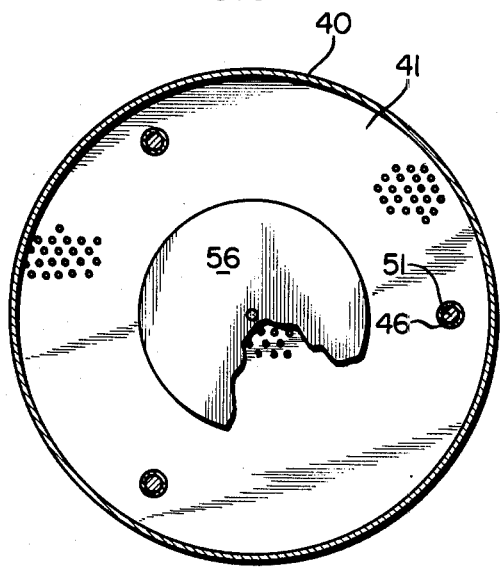

4,352,682

DEOXYGENATING APPARATUS

BACKGROUND OF THE INVENTION

This invention relates generally to equipment for deoxygenating beverage water feedstocks, and more particularly concerns compact, relatively inexpensive equipment for deoxygenating water to be used in the preparation of carbonated beverages.

Modern methods of preparing soft drink beverages involve the mixing of a beverage syrup with deoxygenated water. Use of deoxygenated water improves beverage stability during the beverage preparation process, during beverage container filling, and during storage prior to consumption. If the beverage is contained within a can, included air can permit deterioration of the plastic can lining, thereby damaging the can and spoiling the flavor of the beverage.

Many modern beverage preparation systems therefore include deaeration apparatus of one sort or another. Deaerators are described in U.S. Pat. Nos. 4,191,784; 4,112,828; 3,584,438; 3,574,587; and co-pending applications Ser. No. 06/050,158 filed June 20, 1979, U.S. Pat. No. 4,265,167 Ser. No. 910,184 filed May 30, 1978, U.S. Pat. No. 4,191,784; and Ser. No. 36,069 filed May 5, 1979, U.S. Pat. No. 4,216,711. At least some of these deaerators have met with considerable commercial success.

Some of the patented devices are designed for use in preparing beer. In beer preparation systems, the oxygen content must be reduced to a level on the order of a very few parts of oxygen per billion parts of water. In soft drink or carbonated beverage systems, however, the oxygen content need only be reduced to amounts on the order of a few parts of air per million parts of water. Equipment costs are important to beverage processors.

It is accordingly the general object of the present invention to provide an efficient but inexpensive deoxygenating apparatus for use in soft drink or carbonated beverage preparation systems.

More specifically, it is an object of the present invention to provide carbonated beverage system deoxygenating apparatus which eliminates the use of a vacuum pump in direct contact with the system feed water. Such an invention will eliminate even the remote possibility of oil traces entering the beverage feed water and will also eliminate much of the expense and labor of vacuum pump maintenance.

Another object is to provide such apparatus which will make use of carbon dioxide gas in accomplishing the deoxygenation. This use of carbon dioxide gas permits the effective employment of carbon dioxide gas from other portions of the beverage preparation system so as to avoid wasting that gas. This approach also permits the pre-carbonation of the system feed water so that less carbonation need be applied in downstream portions of the system.

It is another object to provide a deaeration apparatus which operates with great efficiency even when low volumes of water are being processed.

Other objects and advantages of the invention will become apparent upon reading the following detailed description and upon reference to the drawings.

Throughout the drawings, like reference numerals refer to like parts.

BRIEF DESCRIPTION OF THE DRAWINGS

FIG. 3 is a fragmentary elevational view of an upper portion of the apparatus, the view being broken away to show interior portions of the apparatus;

FIG. 5 is a partial sectional view taken substantially in the plane of line 5—5 in FIG. 4; and FIG. 6 is a fragmentary sectional view taken substantially in the plane of line 6—6 in FIG. 4.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Figure 2:
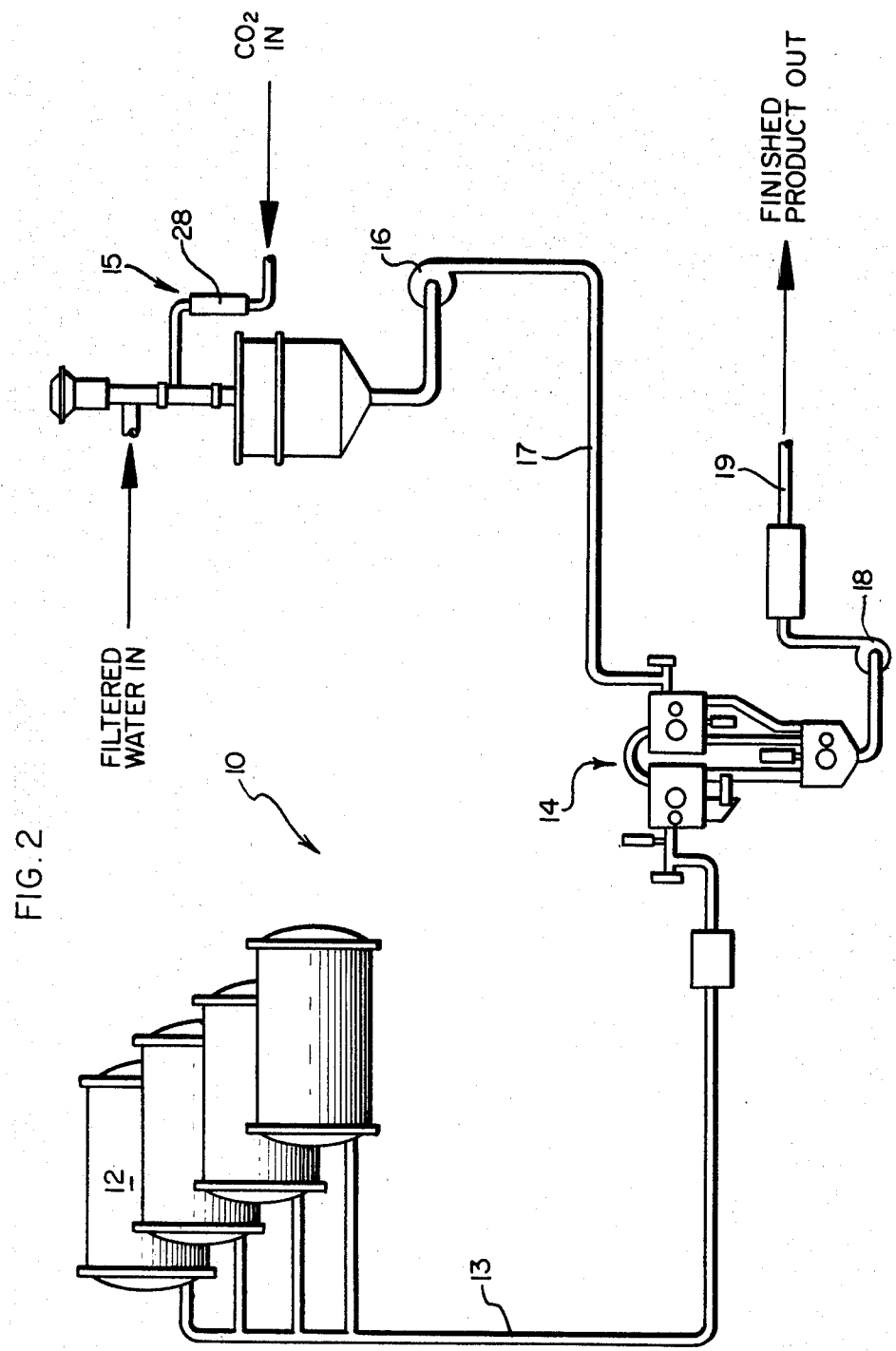
FIG. 2 is a diagram showing, in somewhat schematic form, a portion of a system used in the preparation of a carbonated beverage, the system including the novel deaerating or deoxygenating apparatus of the present invention.

Turning first to FIG. 2, there is shown a system 10 for deaerating or deoxygenating water to be used in a carbonated or soft drink beverage, and for mixing the deoxygenated water with the beverage syrup. Here, beverage syrup is stored in one or more appropriate containers 12 and is routed by piping 13 to a mixing and metering device called a proportioner 14. Pure feed water first enters the novel deoxygenating device 15 of the present invention in another branch of the system. Water drawn from this deoxygenating device 15 is routed by a pump 16 through piping 17 to the proportioner 14. In the proportioner, appropriate quantities of syrup and water are mixed. This mix is then drawn by a pump 18 to a transfer line 19 for routing to downstream carbonating devices, filling apparatus and other known beverage processing machinery (not shown).

Figure 1:
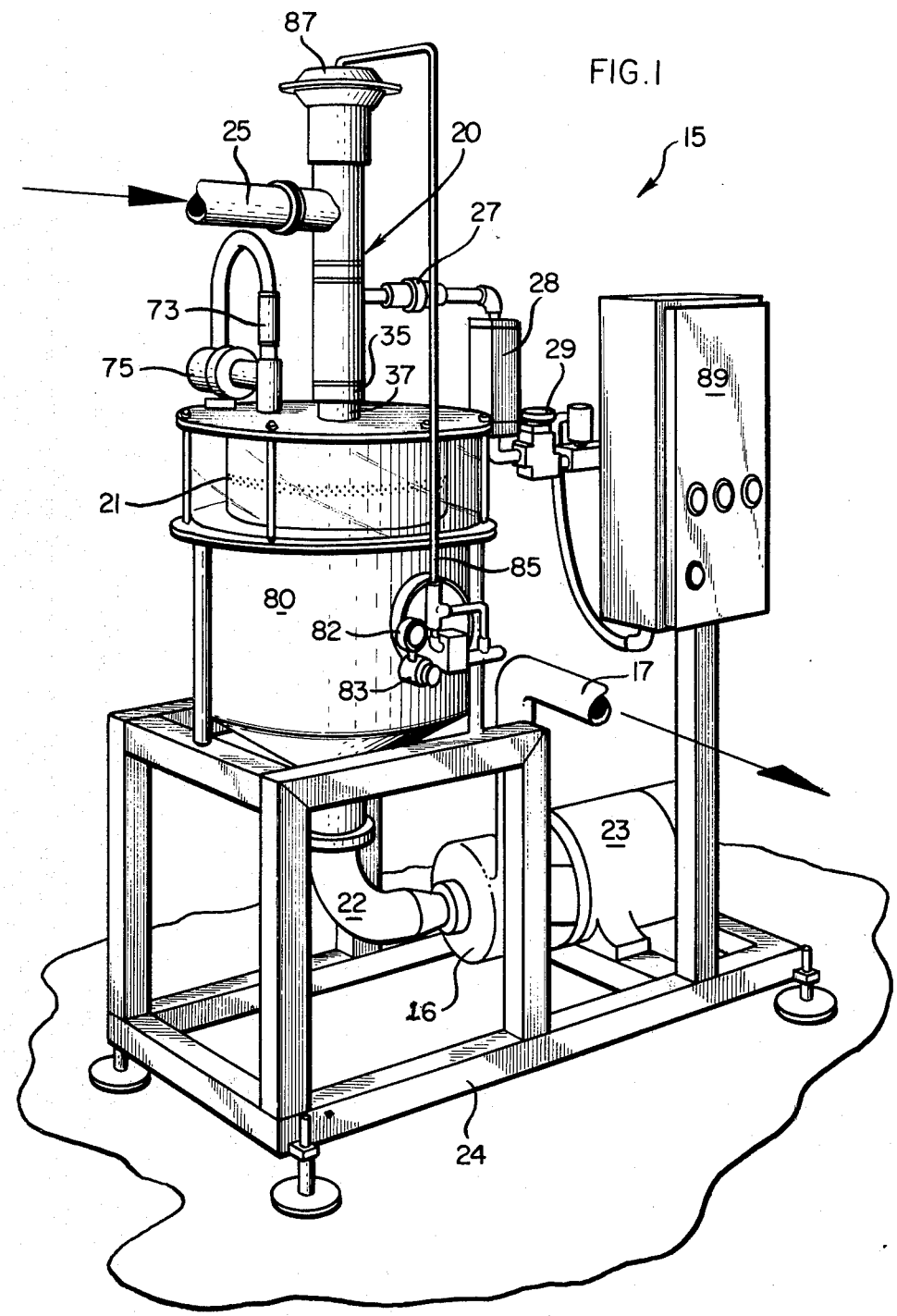
FIG. 1 is a perspective view showing the novel deoxygenating apparatus in its general aspect.

The novel deoxygenating device 15 is shown in further detail in FIG. 1. In general, this deoxygenating device 15 includes a mixing chamber 20 which receives water from an upstream source (not shown) and delivers it to a deoxygenating chamber 21. An exhaust line 22 delivers water from the chamber 21 to the pump 16 and transfer line 17. The pump 16 is here driven by a motor 23; the chambers 20 and 21 are supported above the pump 16 and motor 23 by a frame 24.

In accordance with one aspect of the invention, the mixing chamber 20 is provided with an upstream water inlet 25 which receives oxygen-containing water from the remote water source (not shown). Downstream of the water inlet 25 is a gas inlet 27 adapted to receive carbon dioxide gas from a remote source (not shown). As illustrated in FIGS. 1 and 2, a flow meter 28 is located upstream of the carbon dioxide gas inlet 27 to provide an indication of the amount of gas flowing to the inlet 27 and mixing chamber 20. Various controls 29 located upstream of the flow meter 28 provide either manual or automatic control of the amount of carbon dioxide gas moving toward the inlet piping 27. These valves 29 are set to introduce the carbon dioxide gas through the gas inlet 27 to the mixing chamber 20 at a slight positive gas pressure of, say, 5–10 psig. The gas can be supplied by a remote storage tank (not shown), or the gas can be delivered from downstream portions of the beverage manufacturing and filling system. For example, excess carbon dioxide gas can be drawn from the carbonator and cooler apparatus. It will be understood that other appropriate stripping gases, such as nitrogen, could be used.

In carrying out the invention, the mixing chamber 20 is provided with a quantity of insoluble, reticulated material 30 to encourage turbulent water and gas flow and intimate water and gas inter-mixing action. As shown in FIG. 3, this insoluble reticulated material 30 can be intermingled fibrous material such as metallic steel strands. Stainless steel wool material has been found to be effective yet inexpensive in this application. Below the steel wool material 30, a perforated strainer plate 31 is tack-welded to the chamber wall 32 in a position to retain the steel wool material 30 while permitting the inter-mixed gas and water to pass to a chamber outlet 35 and thence to downstream portions of the apparatus.

Water flowing through the mixing chamber outlet 35 falls directly into the hollow deoxygenating chamber 21.

Figure 4:
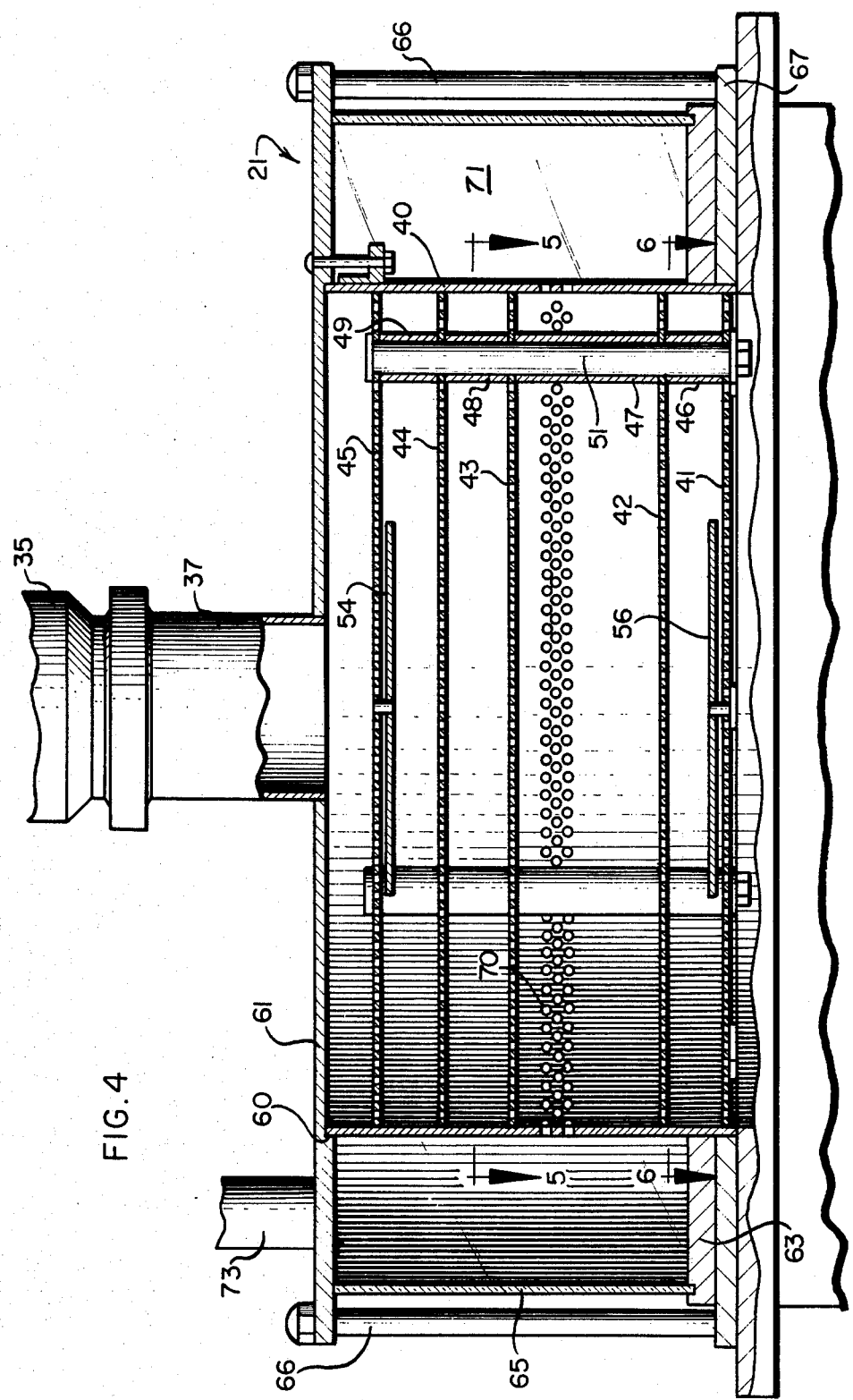
FIG. 4 is a fragmentary elevational view in partial section showing lower portions of the apparatus.

In accordance with the invention, this mixing chamber 21 includes an inlet 37 directly connected to the mixing chamber outlet 35 for efficiently receiving the mixed water and carbon dioxide. As shown in FIG. 4, the deoxygenating chamber 21 includes a relatively cylindrical inner wall 40 within which are mounted at spaced apart locations a number of foraminous plate members 41-45, respectively. Here, five such plates are used. As can be envisioned from FIG. 4, these five foraminous plate members 41-45 are positioned to intercept the incoming, downflowing carbon dioxide and water mixture, and to cause an intimate intermixing of the water and carbon dioxide gas. These foraminous plates 41-45 are positioned at spaced apart locations; this plate spacing can be inexpensively provided by hollow spacer members 46-49 which are mounted upon a bolt device 51. Lateral water and gas flow can be encouraged at low structural cost by providing the uppermost plate 45 with a central baffle or mask member 54. A similar mask or baffle member 56 can be provided on the first or lowest plate 41. These masks 54 and 56 are unperforated, as indicated in FIG. 6.

As shown in FIG. 4, the chamber wall 40 is secured at its upper portions by a recess 60 formed in a cover 61 of the chamber 21. At its lower portions, the wall 40 is mounted within a spacer member 63 which also supports a transparent cylindrical outer chamber wall 65 formed of clear plastic or other suitable material. Outside this outer wall 65 are a number of bolts 66 which secure the top cover 61 to the bottom flange 67 and so directly or indirectly hold the unit together.

It will be noted that a foraminous area defined by a series of apertures 70 is provided at a mediate point in the inner cylinder wall 40. Here, these apertures 70 are provided between the second and third foraminous plates 42 and 43, respectively. As the carbon dioxide gas and water mixture flows downwardly through this deoxygenating unit, excess carbon dioxide gas and oxygen driven from the water can escape through these holes 70 to an outer toroidal gas collection portion of the chamber 71 located between the inner cylinder wall 40 and the outer cylinder wall 65. As indicated in FIG. 1, an exhaust outlet 73 permits excess carbon dioxide gas and expelled oxygen to escape from the unit 15. If desired, a small exhaust pump 75 (FIG. 1) can be used to provide a slight negative pressure (e.g., −1 to −5 psig) pressure within the deoxygenating chamber 21. This negative chamber helps effect an exchange of carbon dioxide gas for the oxygen in the water. Excess carbon dioxide gas and expelled oxygen are drawn from the inner chamber through the wall apertures 70, into the outer chamber 71, and through the exhaust outlet 73 to the pump 75. It will be noted that in accordance with the invention the pump 75 does not contact the feedwater being deoxygenated.

Below the deoxygenating unit 21 is a water collecting basin or tank 80. This tank 80 mounts various level controls 82, 83. When the water level within the tank 80 reaches a high level, a high-level sensor 82 is actuated. This sensor 82 changes air pressure within an air pressure pilot line 85 connected to a pressure-sensitive water inlet valve 87. In this way, the pressure-sensitive valve 87 closes and restricts the inflow of further water to the unit through the unit inlet 25, and a relatively uniform water level within the collecting tank 80 is provided. Controls 89 of known nature can be used to start and stop the pump motor 23, and to make desired adjustments in the rate of carbon dioxide introduction and water level in the collecting tank 80. In accordance with another aspect of the invention, this equipment 15, when constructed as described here, can effectively deoxygenate water having a flow rate as low as 1000 gallons per minute. Thus, the novel deoxygenating apparatus 15 can be used in relatively small beverage processing systems, and in systems subjected to frequent stops and starts and consequent fluctuations in feedwater demands.

The invention is claimed as follows:

1. A gas exchange deoxygenating unit, comprising, in combination, a tubular conduit forming a hollow discrete mixing chamber having an upstream water inlet pipe adapted to receive oxygen-containing water from a remote source, a gas inlet located downstream of the water inlet and adapted to receive a stripping gas from a remote source, a gas flow meter between said remote gas source and said gas inlet, said gas inlet being positioned to inject the stripping gas directly into the water in the mixing chamber, valve means operable to cause said stripping gas to be introduced into said mixing chamber at a positive gas pressure to provide a turbulent water and gas flow within the mixing chamber, and a mixing chamber outlet downstream of the water inlet and gas inlet, the chamber containing a quantity of insoluble reticulated material to further encourage said turbulent water and gas flow and intimate water and gas intermixing in the mixing chamber, the deoxygenating unit further including a discrete hollow deoxygenating chamber having an upstream inlet in fluid communication with the mixing chamber water outlet and comprising a deoxygenating chamber inlet for receiving the combined and mixed water and stripping gas from the mixing chamber outlet, a plurality of foraminous members mounted at spaced apart locations in the deoxygenating chamber and adapted to intercept and cause intermixing of the water and stripping gas, each member having a plurality of orifices extending therethrough, a deoxygenating chamber water outlet, a deoxygenating chamber gas outlet, exhaust means for expelling gas from the deoxygenating chamber through the deoxygenating chamber gas outlet, a water collecting basin connected to said water outlet, a pump for withdrawing the deoxygenated water from said basin, and means responsive to the water level within said basin for controlling the flow of water from said inlet pipe to said mixing chamber.

2. A gas exchange deoxygenating unit according to claim 1 wherein said insoluble reticulated material includes intermingled strands of fibrous material.

3. A gas exchange deoxygenating unit according to claim 2 wherein said fibrous material is metallic.

4. A gas exchange deoxygenating unit according to claim 3 wherein said metallic fibrous material comprises a plurality of steel strands.

5. A gas exchange deoxygenating unit according to claim 1 wherein said plurality of foraminous members are five in number.

6. A gas exchange deoxygenating unit according to claim 5 wherein said deoxygenating unit chamber includes a wall provided with perforations only between a third and a fourth foraminous member.

7. A gas exchange deoxygenating unit according to claim 1 wherein said plurality of foraminous members include a top member and a bottom member, and wherein said top and bottom members are each provided with an unperforated baffle plate.

8. A gas exchange deoxygenating unit according to claim 1 wherein said deoxygenating chamber is at least partially defined by a foraminous chamber wall.

9. A gas exchange deoxygenating unit according to claim 1 further including a second wall surrounding said foraminous deoxygenating chamber wall to provide a toroidal gas collection space.

* * * * *